United States Patent
Andruss et al.

(10) Patent No.: US 8,924,352 B1
(45) Date of Patent: Dec. 30, 2014

(54) AUTOMATED PRIORITY BACKUP AND ARCHIVE

(75) Inventors: William Dale Andruss, Minneapolis, MN (US); Christopher Hercules Claudatos, San Jose, CA (US); Steven R. Terwilliger, Foster City, CA (US)

(73) Assignee: EMC Corporation, Hopkinton, MA (US)

( * ) Notice: Subject to any disclaimer, the term of this patent is extended or adjusted under 35 U.S.C. 154(b) by 800 days.

(21) Appl. No.: 11/824,254

(22) Filed: Jun. 29, 2007

Related U.S. Application Data (63) Continuation-in-part of application No. 11/731,921, filed on Mar. 31, 2007, now Pat. No. 8,463,798.

(51) Int. Cl.
*G06F 17/30* (2006.01)

(52) U.S. Cl.
USPC ............... 707/640; 707/654; 707/999.007; 707/999.204

(58) Field of Classification Search
USPC ............ 707/640, 999.007, 999.008; 711/161, 711/162
See application file for complete search history.

(56) References Cited

U.S. PATENT DOCUMENTS

| | | | |
|---|---|---|---|
| 5,659,614 A * | 8/1997 | Bailey, III ..................... | 713/165 |
| 5,966,730 A | 10/1999 | Zulch | |
| 6,148,372 A * | 11/2000 | Mehrotra et al. ............. | 711/122 |
| 6,226,759 B1 | 5/2001 | Miller et al. | |
| 6,496,949 B1 | 12/2002 | Kanevsky et al. | |
| 6,687,222 B1 * | 2/2004 | Albert et al. .................. | 370/230 |
| 6,880,051 B2 | 4/2005 | Timpanaro-Perrotta | |
| 6,982,842 B2 | 1/2006 | Jing et al. | |
| 6,999,978 B2 | 2/2006 | Frank et al. | |
| 7,073,036 B2 | 7/2006 | Furuya et al. | |
| 7,103,740 B1 | 9/2006 | Colgrove et al. | |
| 7,231,502 B2 | 6/2007 | Lam et al. | |
| 7,266,718 B2 | 9/2007 | Idei et al. | |
| 7,318,095 B2 | 1/2008 | Husain et al. | |
| 7,412,583 B2 | 8/2008 | Burton et al. | |
| 7,418,464 B2 | 8/2008 | Cannon et al. | |
| 7,529,785 B1 | 5/2009 | Spertus et al. | |
| 7,529,830 B2 | 5/2009 | Fuji | |
| 7,620,843 B2 | 11/2009 | Zohar et al. | |
| 7,657,796 B1 | 2/2010 | Kaiser et al. | |
| 7,694,092 B2 | 4/2010 | Mizuno | |
| 2002/0013832 A1 | 1/2002 | Hubbard | |
| 2002/0103908 A1 | 8/2002 | Rouse et al. | |
| 2003/0120772 A1 | 6/2003 | Husain et al. | |
| 2003/0145226 A1 | 7/2003 | Bruton et al. | |
| 2003/0177324 A1 | 9/2003 | Timpanaro-Perrotta | |
| 2003/0212716 A1 | 11/2003 | Steele et al. | |

(Continued)

*Primary Examiner* — Anteneh Girma
(74) *Attorney, Agent, or Firm* — Theodore A. Chen; Krishnendu Gupta (57) ABSTRACT

A method, article of manufacture, and apparatus for backing up or archiving objects from a first location to a second location, comprising determining the objects to be backed up and a prioritization of the objects according to a first criterion. The objects are transmitted from the first location to the second location substantially in accordance with the prioritization. The transmission may be suspended in accordance with loss of network connectivity, a user action, or throttling to reduce processor or network load. Transmission may be continued, and the objects reprioritized according to the first criterion, wherein relevant changes in the objects are reflected. A backup target may be chosen based on the location of the source, and if the location changes, a new backup target may be chosen in consideration of bandwidth. The backups to the backup targets may be combined to define a backup.

16 Claims, 3 Drawing Sheets

(56) References Cited

U.S. PATENT DOCUMENTS

| | | |
|---|---|---|
| 2004/0034672 A1 | 2/2004 | Inagaki |
| 2004/0049519 A1* | 3/2004 | Itakura et al. .............. 707/104.1 |
| 2004/0051988 A1 | 3/2004 | Jing et al. |
| 2004/0073676 A1 | 4/2004 | Honma et al. |
| 2005/0138310 A1* | 6/2005 | Horiuchi .................... 711/162 |
| 2005/0177767 A1* | 8/2005 | Furuya et al. ................ 714/13 |
| 2005/0257085 A1 | 11/2005 | Haustein et al. |
| 2006/0167838 A1 | 7/2006 | Lacapra |
| 2007/0055660 A1 | 3/2007 | Anderson |
| 2007/0112892 A1* | 5/2007 | Langley et al. .............. 707/204 |
| 2007/0130599 A1 | 6/2007 | Monroe |
| 2007/0136286 A1 | 6/2007 | Webster et al. |
| 2007/0136375 A1* | 6/2007 | Ando et al. ................ 707/104.1 |
| 2007/0136541 A1 | 6/2007 | Herz et al. |
| 2007/0168715 A1 | 7/2007 | Herz et al. |
| 2007/0180058 A1 | 8/2007 | Wu et al. |
| 2007/0226213 A1 | 9/2007 | Al-Masri |
| 2007/0254697 A1 | 11/2007 | Sugio et al. |
| 2007/0271316 A1 | 11/2007 | Hollebeek |
| 2008/0016310 A1 | 1/2008 | Ghosal et al. |
| 2008/0028008 A1* | 1/2008 | Brunet et al. ................ 707/204 |
| 2008/0034249 A1 | 2/2008 | Husain et al. |
| 2008/0046483 A1 | 2/2008 | Lehr et al. |
| 2008/0072002 A1* | 3/2008 | Kuwahara et al. ............ 711/162 |
| 2008/0154805 A1 | 6/2008 | Gurumoorthy et al. |
| 2008/0163218 A1* | 7/2008 | Ostermeier et al. .......... 718/101 |
| 2008/0177825 A1 | 7/2008 | Dubinko et al. |
| 2008/0222376 A1 | 9/2008 | Burton et al. |
| 2008/0270823 A1 | 10/2008 | Hare et al. |
| 2008/0282253 A1 | 11/2008 | Huizenga |

* cited by examiner

AUTOMATED PRIORITY BACKUP AND ARCHIVE

CROSS-REFERENCE TO RELATED APPLICATIONS

This application claims priority as a continuation-in-part to co-pending U.S. patent application Ser. No. 11/731,921 for PRIORITIZED RESTORE, filed Mar. 31, 2007, which is incorporated herein by reference for all purposes. This application is related to co-pending U.S. patent application Ser. No. 11/824,231 for PRIORITIZED BACKUP and filed concurrently herewith, which is incorporated herein by reference for all purposes.

FIELD OF THE INVENTION

This invention relates generally to backup, and more particularly to systems and methods for performing backup or archive operations on data.

BACKGROUND OF THE INVENTION

This invention relates to systems and methods for performing backup or archive operations on data. A system's or data's importance to an organization or user is often used as a determining factor in assigning the degree to which the data or systems are protected. Some forms of protection are as simple as keeping backup copies of systems and data ("backups"), while others make use of redundant systems with rapid failover capabilities to ensure functional continuity. Generally speaking, backup systems that provide rapid or near instant backup cost more than systems which provide slower backup methods. As a result, backup time for some users/data may take longer than the user would like. As undesirable as this may be for the user, the enterprise may not be willing to spend additional money on a faster backup system.

Another factor affecting backup times is the bandwidth of the connection between the protected system and the backup repository. High bandwidth connections such as those made over a wired LAN may be as much as 100 megabits per second (Mbps), 1 gigabits per second (Gbps), or more. At these speeds backup can be completed in hours or even minutes with the largest backup sets. The same is not true of lower bandwidth connections. Many remote offices and remote workers are connected to their headquarters via low-bandwidth connections, commonly 1 Mbps and 2 Mbps connections. At this low bandwidth, backup of commonly sized hard disk drives can take more than a day and sometimes weeks.

Mobile, remote, and home office workers have always presented a problem to traditional centralized backup and archive solutions. Remote office and home office workers are hampered by low-bandwidth connections to centralized data centers. Mobile workers are further hampered by their dynamic and non-persistent network connectivity. At low-bandwidth connection speeds, backup of commonly sized hard disk drives would take more than a day and sometimes weeks to complete. Dynamic and non-persistent network connectivity only extends the amount of time it would take to complete a backup.

Window of Opportunity solutions (backup solutions that backup by queuing multiple small data sets with suspend/resume support or solutions that use a single data set with suspend/resume support) have successfully demonstrated the ability to work within the confines of low-bandwidth and non-persistent connectivity to deliver centralized data protection solutions for mobile, remote and home office users. However, such solutions may take hours, days, or weeks to complete initial backup or backup where large amounts of new data have been created.

There exists a need to inexpensively and rapidly perform backup operations on data over any variety of connection speeds in order to adequately protect the system/user in as little time as possible. Due to cost considerations, this objective should be accomplished without increasing the speed or number of connections between the backup data and the system, or increasing the speed, performance, throughput, or number of processors and/or data storage devices.

There is a need, therefore, for an improved method, article of manufacture, and apparatus for performing backup operations on data.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

An embodiment of the invention will be described with reference to a computer system on which a backup program executes, but it should be understood that the principles of the invention are not limited to this particular configuration. Rather, they may be applied to any system in which data is transmitted across a connection to a remote device, and the system may comprise one or more devices. The system may comprise a personal computer, personal digital assistant (PDA), mobile phone, or other electronic device. Although the methods herein are described in terms of their application to performing backup operations on data, one skilled in the art will recognize that they are equally applicable to other cases for which it is desirable to transfer data across a connection, including but not limited to restore, replication, archiving, and transmission. For example, the principles disclosed herein may be applied to replication, to rapidly create a functionally useful replication set at another location. Disclosed herein are a method and system to back up data, in a manner that provides functional protection to a remote system as quickly as possible. Thus, rapid backup of data will be facilitated. The principles described herein will be of particular benefit to remote offices connected to a main office or online backup/storage service provider through low bandwidth connections, and to mobile (non-persistently connected) systems, but are beneficial to local systems connected via high bandwidth connections as well, such as in hierarchical storage management systems and local replication. The terms "files" and "data" are used herein to refer to objects, but it should be understood that the disclosure is not restricted to files. Rather, it applies equally to block level backup, image level backup, or any combination or variation of these, and to any data objects used in a backup, restore, replication, archive, or transmission process or part of a backup, restore, replication, archive, or transmission process.

Figure 1:
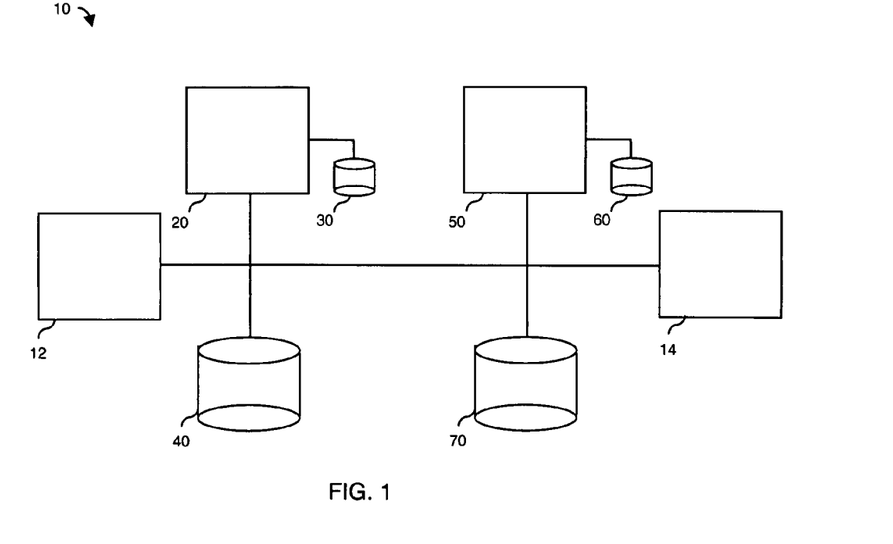
FIG. 1 is a diagram of an embodiment of a system in accordance with the invention.

FIG. 1 illustrates a configuration in which a backup and restore system 10 comprising a backup program could be used to back up data. Backup server 20 communicates with system 50 over a network (e.g., a local area network, wide area network, etc.). System 50 may have a backup client executing on it, and may have storage systems 60 and/or 70 on which its data is stored. System 50 may send its backups to storage system 40 or storage system 30 attached to backup server 20. When restore operations are performed, backup data from storage system 40 or storage system 30 may be restored to storage system 60 or storage system 70 for use by the system 50. An agent executing on system 12 may be used to scan the backup to determine prioritization of the files or data stored on storage system 30 or storage system 40. In one embodiment, the agent executing on system 14 may be used to scan the files or data on storage system 60 or 70. In some embodiments, the agent may execute on backup server 20 or system 50. The agent may be used to capture information about usage of the files or data. It will be understood that the agent may execute on any of the systems shown or on other systems, and that more than one agent may be used. Various configurations are possible, and the principles disclosed herein are not limited to the embodiment disclosed.

Backups may be full, incremental, or differential. A full backup may be performed, and files that have changed since the last backup (the last full backup or any backup) may be backed up. Typical backup systems back up data in arbitrary order, such as in the order the data appeared on the original system (e.g., within the backup or archive pool). Similarly, replication systems may arbitrarily transmit data in the order that they appear on the source system. However, the majority of the files/data contained in the backup set (or set to be replicated) are often not in need of immediate protection or as important to the user or system as other files. Data backup/archival is performed according to the arbitrary order of the data within the backup pool or archive, without any sense of priority in relationship to user or application importance or urgency. This is typical of file-based and image-based backup technologies.

The backup process can be accelerated through the use of data de-duplication techniques ("RDE" redundant data elimination) and compression. However, the benefit of de-duplication is diminished when data is encrypted or is of a sufficiently random data type such as music, video, and photos. These techniques may be used to accelerate backup and reduce bandwidth required, but may still benefit from prioritized backup as disclosed herein.

A user may want all of the files backed up, but not all the files may be critical to back up immediately, and there may be files that are of current importance and value to the user or system that should be protected as soon as possible. If these files or data are backed up with higher priority and before the less important files, then the user or system will have protection of important files much sooner than if the files were backed up in random order or with arbitrary priority. Protection may be from the viewpoint of the system, in terms of files that are needed by the system (or an application using or executing on the system), or from the viewpoint of the user, in terms of the files that are needed by the user.

In some cases, network connectivity may be dynamic and non-persistent, such as in the case of laptops, PDAs, and mobile devices. Although the goal would be to back up all of the data or an identified data set, the data within the set may represent a spectrum of importance and value. Folders, files, and data that are of highest importance and value may be prioritized and protected (e.g., backed up) in order of their priority. Backup prioritization may be recalculated dynamically, such as between the suspend/resume actions of the backup application, and the recalculation may be based on changes taking place since the last calculation of backup priority. Suspend/resume actions of the backup may be associated with network connectivity, action of the user, or automated (such as throttling to reduce processor or network load).

Figure 2:
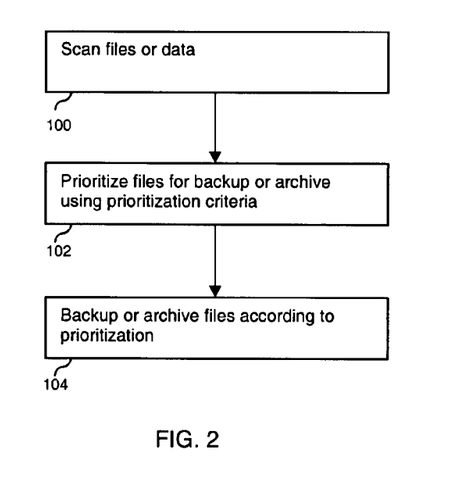
FIG. 2 is a flowchart illustrating a process for prioritizing and backing up data in some embodiments of the invention.

Data may be backed up based on one or more algorithms that determine the order in which to back up the data. These algorithms may be used to determine which files are likely to be most important to the user or system to back up. The backup order of the files may be based on this determination, resulting in backup of files with the greatest importance before backup of other files with less importance. This approach provides the user or system with rapid protection of the most important files or data objects before the entire set of files or objects is fully backed up. FIG. 2 illustrates an embodiment of this process. The files or data are scanned, step 100. In step 102, the files are prioritized according to the prioritization criteria, as will be described herein. The files may be backed up (or archived or replicated) according to the prioritization, step 104.

A variety of algorithms may be used individually or in combination to determine an appropriate backup order. In one embodiment, a Most Recently Used (MRU) algorithm may be used. For example, files may be ordered according to their last use date and time, and in this approach, the file that was used last is backed up first. The next to last used file is backed up second and the process continues accordingly until all the files are backed up. A file's timestamp metadata may be used to determine the most recent use of the file. A variety of file metadata, such as creation timestamp, last access/read timestamp, last metadata change timestamp, last archive timestamp, may be used individually or in combination to best assess importance. Timestamp metadata may be kept as an intrinsic part of the data itself, or this information may also be copied and kept as part of another data structure such as a database or XML file for use by the backup/archive application. Usage of a data structure to store timestamp information of files facilitates processing without need to open each file or object to analyze timestamps. The timestamp may contain several attributes, such as time and date. Prioritization may be also be done by timestamp ranges, defining a range of times and/or dates, and assigning a priority to each range. For example, several timestamp ranges may be defined, with the first range being timestamps within the last few hours, timestamps within the past day, timestamps within the past week, etc. with higher priority going to the most recent timestamp range.

In one embodiment, files may be ordered according to file type, such as document files (example: Microsoft Word documents or Adobe PDF documents), presentation files (example: Microsoft PowerPoint files), spreadsheet files (example: Microsoft Excel files), database files (example: Microsoft Access files), and so on. For example, PowerPoint files may take precedence over text files (.TXT). File types may be grouped with the same priority and given higher or lower priority than other groups or individual file types. For example, all Microsoft Office file types can have the same higher priority than text files (.DOC, .XLS, .PPT>.TXT). The prioritization and grouping may be determined by the application vendor, the system administrator, the user, etc. Groups of file types may be defined according to their association to an application, application suite, task, and so on. Priority may be assigned to a group such that each file type in the group would have the same priority. File type data may be kept as an intrinsic part of the data itself. This information may also be copied and kept as part of another data structure such as a database or XML file for use by the backup/restore application.

In one embodiment, the frequency of a file's use or its periodicity (usage cycle) may be used to determine the backup priority of the file. Therefore, higher backup priority may be given to files having higher frequency of use or whose periodicity coincides with the current or desired timeframe. Frequency of use may be tracked by recording each access to a file, storing this information in metadata associated with the file or in a central data structure. Files that are frequently used may be considered to be more important and therefore prioritized for backup over other files that need backup.

Periodicity may be determined by tracking file or data usage, such as by logging. The log may be native to the system or application, or an independent logging system may be used to provide a record of file and data usage. In some embodiments, periodicity may be determined through analysis of backup data sets and archives. Within the backup and archive data sets there exists a body of data which can be mined for the purpose of predicting usage intervals using any of a variety of analytic and predictive techniques. Timestamp data can be collected from backup data sets and archives and used to create a usage record of the file and data in question. Based on the history of file/data usage, a usage interval may be derived, and utilized in predicting or estimating the next time of usage. The mean interval may be calculated, or various statistical methods can be used for data smoothing and analysis to predict the next time of usage. Such methods may include time-series modeling, regression analysis, autoregressive models, moving averages, and so on. This approach may be used to predict the temporal value of the file. Files that are needed soon or within the desired timeframe may be considered to be more important and therefore prioritized for backup over other files that need backup. These prioritized files may be the ones needed the most/first in the event of data loss and a subsequent restore.

For example, in a simple approach, suppose File X was opened on these dates: Jan. 1, 2004, Jan. 3, 2005, Jan. 2, 2006, and Jan. 1, 2007. If the current date (the recovery or transmission date) is Dec. 28, 2007 and the system is performing a backup operation, and the total backup interval will take 2 weeks, the system may need to predict which files will be modified while the backup is taking place. Given this, the timeframe or window will be at least within two weeks beginning Dec. 28, 2007. Based on the above data, File X's periodicity may be calculated at 365 days, with a deviation of +/−2 days. This implies that File X's next usage point in time will fall within two weeks for Dec. 28, 2007. In one embodiment, the month/day with highest frequency of usage could be used. In this case, the file was used twice on January 1, and once on January 2 and 3, resulting in a predicted date of usage Jan. 1, 2008. A conservative date of Dec. 30, 2007 may be assigned as this would be two days prior to the predicted usage date. In some cases, the predicted usage date may be just prior to the current date, and the file may not have been used recently. This may be taken as an indication that the file will be used soon, and it may be desirable to ensure that such files with predicted dates occurring just prior to the current date are prioritized for backup or transmission. In one embodiment, a backup window may be defined to include a time period prior to the current date, and the window need not be symmetric about the current date. Several ranges may be defined, with a different priority assigned to each. In one embodiment, the range including the current date could receive the highest priority, with other ranges representing future dates receiving lower priorities with increasing distance from the current date.

Using this information, a priority or score may be associated with the file and used to establish the file's backup priority. This prioritization from predicted usage may be used to determine final prioritization, or combined with other factors such as file type. Weighting the results may offer additional dimensions that could improve the functional backup rate, as timestamp or predicted usage alone may not be sufficient to effectively predict which files should be protected first. For example, some files may be used on an annual basis and their last date of use may be outside a specified backup time period that has high priority associated with it. In this case, the timestamp alone would suggest that the file not be backed up with high priority. However, by determining the interval of use, it is possible to assign a high priority to the backup of the file if the due date or anniversary of use is close to the current date. On the other hand, a file may have been used recently, which might cause its timestamp score to favor priority backup. This file might also have a predicted usage date that is a year away, which might cause its predicted usage score to favor lower priority. Scoring may be used to reflect priority determinations that have been made. For example, a file falling within the specified time period could have a certain number of points added to its priority score, and if the file's predicted next use is close to the current date or time, more points could be added to its priority score.

Other variations may include detecting the frequency of file usage during a period near the backup date. For example, if two files have the same timestamp attribute they are likely to be given the same backup priority. If prioritizing the files requires placing one file above the other in importance, the frequency of use can be used to further refine the backup priority. In this example, both files have the same timestamp attribute but one file was used every day for the last two weeks whereas the other file changed once since its creation. The file with the frequent and recent file changes can receive a higher weighting than the other file, if this is believed to indicate that the file is more important (because it is more frequently used). This permits priority based on multiple relevant factors.

There are several ways to capture periodicity:

1) Explicit logging of file and data usage each time the file/data is read, written, or in any way touched. This may in one embodiment be handled by a real time filter driver that logs all reads and writes. In one embodiment, an application may be executed according to a scheduled interval to log changes in non-real time. In this case the timestamp attributes of the files may be read and stored within a database or other data structure. At each interval, the results of the timestamp collection are accumulated and retained within the database resulting in a view of the frequency and intervals of change for each file. The selection of the scheduled interval determines the temporal granularity of the resulting log. For example, if an interval of one month is scheduled the resulting log will be able to show which files changed from month to month. Because the scan is run on a monthly basis, the resulting log will not be able to discern files which change at greater frequency such as daily, hourly, etc. Greater temporal granularity may be achieved through higher frequency scans up to the point of real-time change logging in which every read and write is logged as it occurs.

2) Indirect logging of file and data usage. Some applications or file systems may keep track of historical file/data activity. Through examination and analysis of these records it may be possible to determine periodicity.

3) Retrospective logging of file and data usage. Through examination and analysis of backup data sets and archives, it is possible to determine file and data usage even though such logging did not occur at the time of original usage. The backup data sets and archives provide a historical snapshot of file and data states at specific points in time.

Periodicity may be determined in some embodiments by causing the backup client to maintain a usage history log that may be used to create a priority list. In some embodiments, the server may collect and compare previous backups and log usage history to create a priority list, and the client may use this list to determine the order of files to back up. Some combination of the foregoing may be possible, with information shared/distributed across different elements in the configuration. Prioritization may be performed at the time of backup (such as immediately before the backup begins), at the time of file usage (such as re-calculating priorities when file usage occurs), or at periodic intervals. If prioritization is performed at the time of backup, the client or host may walk the file system, evaluate files, and create a priority list, which may contain file names and their respective paths. If prioritization is performed at the time of file usage, the client or host may maintain a read and/or write activity log (or use an existing log such as from a journaling file system or from another application), and set priorities based on prioritization methods as described herein.

These methods may be combined in any combination or order, and used to refine orders determined by other methods. For example, the MRU algorithm may be applied, and the most recently used files may be further ordered by their file type priority and backed up in the resulting order. Time/date ranges may be used to prioritize the files, which may result in larger groups of files having the same priority, and the resulting list of files may be subsorted by file type, producing a list that is ordered by time/date range and subordered by file type. The files may conversely be ordered by file type and subordered by time/date range. Prioritization by periodicity may be implemented by using time/date ranges of predicted next use, and the results subsorted by file type or timestamp or other criterion. Other combinations of the disclosed methods may be used, in various orders, and weighting may be used to determine the importance of each characteristic to the backup priority. As has been described herein, one or more criteria may be used for prioritizing the files.

Thus, data may be backed up in a directed and intentional manner, determined according to the immediacy of value to the user and/or system. The determination of backup priority may be performed by a backup application, by a restore application, by an application that makes use of the data, or by an application that prioritizes the data and passes it (directly or indirectly) to another application, such as the backup application, to perform the backup. The backup/transmission of files or data in order of priority may be made in sequential fashion, or some parallelism may be used (i.e., more than one file may be sent at a time).

Figure 3:
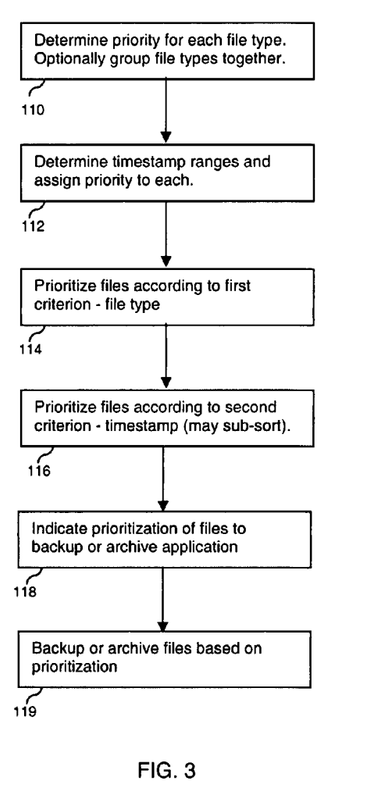
FIG. 3 is a flowchart illustrating a process for prioritizing according to file type and/or timestamps and backing up data in some embodiments of the invention.

FIG. 3 illustrates a process flow in an embodiment. In step 110, priorities are determined for file types. File types may be grouped together, such that all file types in the same group have the same priority. Groups may be defined according to their association with an application, application suite, task, etc. In step 112, timestamp ranges may be defined and priorities assigned to each timestamp range. In step 114, files may be prioritized according to the first criterion; in this case, file type. Files may be prioritized according to timestamps (the second criterion), step 116, and this may be done by subsorting the prioritized files from step 114. The prioritization of files may be indicated to the backup application (or archival, replication, or other transmission application), step 118. This may, for example, be done by providing a list of files with priorities indicated, providing an ordered list, or altering a native backup set, as described herein. Files may be backed up (or archived, replicated, or transmitted) according to the prioritization, step 119.

Figure 4:
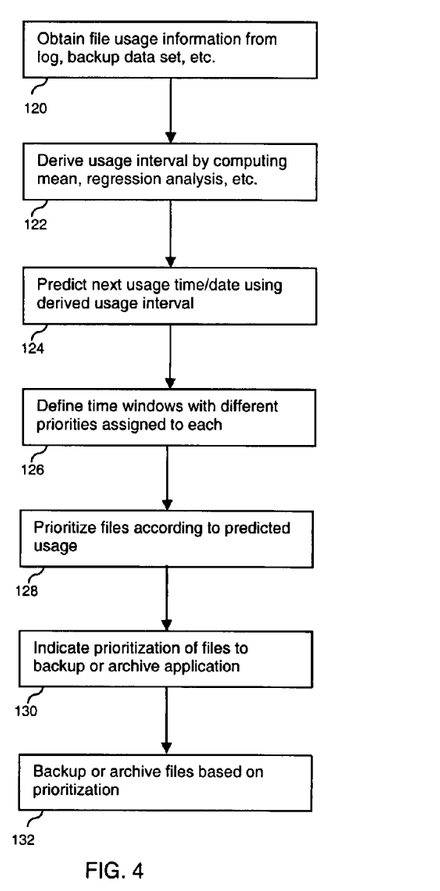
FIG. 4 is a flowchart illustrating a process for prioritizing according to periodicity and backing up data in some embodiments of the invention.

FIG. 4 illustrates a process flow in an embodiment. In step 120, file or data usage information may be obtained from a log, backup data set, or other source of file usage information. The data usage information is analyzed to determine the usage interval, step 122, and various methods may be used such as computing the mean, performing a regression analysis, etc. The predicted usage date is derived, step 124, and using defined time windows with different priorities assigned to each, step 126, the files are prioritized according to predicted usage in step 128. The prioritization of files is indicated to the transmission (or backup or replication) application, step 130, and the transmission is performed in step 132.

Priorities may also be set based on the user's identity or organizational role. Files associated with a user or organizational role may be considered to be more important than those of another user or organizational role. The user or organizational role may be used to determine which file types should receive priority, and higher priority given to files with greater relevance to the user's identity or organizational role. For example, if the user is an accountant, spreadsheet files may be given higher priority over music files. In some embodiments, this may be used as a further prioritization of files prioritized by timestamp, file type, and/or other methods of prioritization.

In some cases, the user identity/organizational role information may not be an intrinsic part of the data, and this information may be derived from one or more sources external to the data being backed up, replicated, archived, etc. Sources for this information may include Microsoft's Active Directory, LDAP, or other directories of resources. Alternatively, the source could be a policy engine or explicitly provided identity/role provided directly to the backup/restore application. Once obtained, the information may also be copied and kept as part of another data structure such as a database or XML file for use by a backup/restore application.

File names may in some embodiments be used to determine prioritization of a file, possibly in combination with other determining characteristics described herein. For example, a spreadsheet file with a high priority timestamp for an accountant user may get a higher priority if the file's name is "HOT ACCOUNTS FILE.XLS". Conversely, a similar spreadsheet file for the accountant with the same timestamp rank may get a lower priority if the file's name is "Donut List.XLS". File name data may be kept as an intrinsic part of the data itself. This information may also be copied and kept as part of another data structure such as a database or XML file for use by the backup/restore application.

In some embodiments, folder or directory names may be used to determine the prioritization of a set of files, such as in combination with other determining characteristics described herein. For example, a folder may get a higher priority if the folder's name is "Quarterly Reports". Conversely, a similar folder for the accountant may get a lower priority if the folder's name is "Final Four Brackets". The "My Documents" folder could be classified as highest priority, and this priority could be inherited by the files in that folder. Subsorting of the files in the folder may be done according to other criteria such as those described herein. Folder name data may be kept as an intrinsic part of the data itself. This information may also be copied and kept as part of another data structure such as a database or XML file for use by the backup/restore application.

Some types of files may use content metadata, which may be used in determining priority. In some cases, these file types are associated with a single or limited set of applications (such as Microsoft Word documents). Other examples of this are XML documents. Within these documents, backup-priority fields or data may be used to determine backup priority. For example, Microsoft Word documents have a Properties field in which many attributes of the document are set. Similarly, a backup priority attribute could be set and stored as part of the document. File content metadata may be an intrinsic part of the data itself such as in the Microsoft example above, or it may be a separate data element and contained within a separate file or data structure. This information may also be copied and kept as part of another data structure such as a database or XML file for use by the backup/restore application.

Backup priority may, in some embodiments, be based on an evaluation of the file's content, alone or in combination with other characteristics such as those described herein. In this method, a file's content is parsed for specific content and compared against a lexicon, rule set, or other content analytical tools in order to assign a backup priority. For example, if a prioritization tie exists, a file whose content indicates relevance to the current month's financial report may be given higher priority. File content is an intrinsic part of the data; however, it is the classification and analysis of this content that is relevant to setting a backup priority order. In some embodiments, this information may be created outside of the file content itself and retained separately. This information may also be copied and kept as part of another data structure such as a database or XML file for use by the backup/restore application.

Separately or in addition to the above, backup priority of a file may also be set by the user and/or administrator, such as by a file attribute. In the case of file name or file content metadata, the user/administrator can set the backup priority to supersede the priority set or determined programmatically. In some embodiments, when a file is created or modified, its backup priority may be set or adjusted by the user. For example, a recommended or predicted priority may be preselected for the user based on automatic evaluation of certain criteria. This predicted priority may be the "default" priority for that file, which the user may change. This approach would provide the ability to determine a default priority for each file, as opposed to default settings that are applied uniformly to all files. In this approach, the priority is dynamically determined based on the evaluation of one or more criteria affecting priority. The backup priority of the file may be kept as file metadata, and kept as an intrinsic part of the data. This information may also be copied and kept as part of another data structure such as a database or XML file for use by a backup/restore application.

In some embodiments, the user/administrator may set the priority before or during the backup process. The user may be presented with a directory structure or list of files that are about to be backed up, or are in the process of being backed up, which the user may then reorder. A suggested or default priority order may be presented, based on automatic evaluation of criteria (such as file type, frequency of use, periodicity, etc.). The user may place the most important file first, the next most important file second, and so on until all pending backup files are listed. The user may be presented with a directory structure, and indicate the backup priority of a given file, folder, sub-folder, volume, etc. This may be done numerically, graphically, or by assignment of a classification. Classifications may be used to indicate group priorities; e.g. an Immediate group for the most important files, an ASAP group for the next most important files, a Normal group for the next most important files, etc. Files may be further prioritized within each group, either manually pr automatically.

Disclosed herein are several methods for a backup operation to proceed according to a prioritized sequence, by which file prioritization can be indicated to the backup operation. In some embodiments, prioritization may be performed on the backup client residing on the source system, on the backup host/server, or both. In some embodiments, a simple prioritization could be performed in which the client walks the file system (or the objects that are to be protected) and orders files based on last use. Determination of prioritization may be made before, after, or at the same time as determination of whether files need to be backed up.

In an embodiment, a list of files or objects may be created that prioritizes the files for backup. This list may contain the file names, paths, and other data elements associated with the file, its location, and its backup-priority so that a backup program may use the information to select and backup the files according to the files' priority settings. The list may be kept in priority order. In one embodiment, priority ordering of the list is not required, and the ordering of file backups may be performed dynamically based on the priority information contained within the list. The list can be in any commonly known type or format or in a proprietary format known only to a proprietary application. For example, the list may be a text file, an XML file, or a database file.

Figure 5:
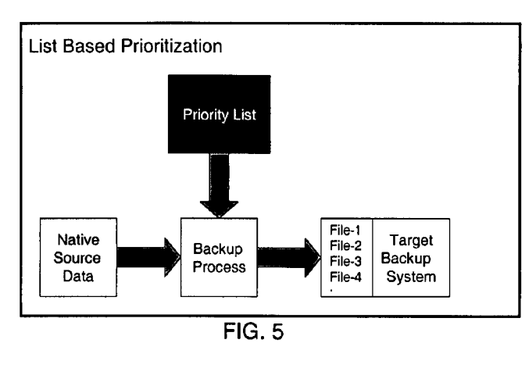
FIG. 5 is a flowchart illustrating a process for executing a list-based prioritized backup in some embodiments of the invention.

The list may be passed to the backup (or archival, replication, restore, transmission, etc.) application in a programmatic fashion such as through XML. Alternatively, the list could be created in a form that is identical to and compatible with the native data format of the application. For example, if a backup application is not "priority backup capable" but simply backs up files in an arbitrary or non-prioritized manner, it will not be able to accept direction to perform prioritized backups. In this case, the information within the priority list may be constituted in a form that is compatible with the application's native function. If the backup application uses a comma delimited file to contain its list of pending files to be backed up, then the prioritized list of files may be presented in a comma delimited format usable by the backup application. In this manner, the backup application may perform priority backups without internal modification to the application. This process is illustrated in FIG. 5.

In one embodiment, native backup data sets may be reordered to backup files in order of priority. Existing backup and restore applications keep their backup data within a data structure (e.g., a file system or a database). Depending on the application, the backup operation may sequence the data according to the order in which the data are ordered within the data structure itself. Alternatively, the application may make use of some form of indexing or list structure to sequence the backup operation of the data. In some embodiments, the backup sequence may be imposed on the backup operation to cause the backup operation to proceed according to a priority order. Some methods for accomplishing this will be described herein.

If the application sequences the backup operation according to the native order of the data structure, then the native order may be re-rendered so that the order matches that of the priority order. The data structure may be reordered at the time the backup operation is initiated, at the time of backup, or prior to the initiation of the backup operation but before the backup operation.

If the application sequences the backup operation according to an order defined within an index, list, database, etc., then the order of that data structure may be changed to conform to the desired priority order. The order of the backup data itself is not required to change in any way. Reordering may be accomplished with a variety of well-known methods. The sorting algorithm may be selected based on the desired outcome. In some cases it is desirable to have an initial sort performed on the data set and then a subsort on subsets of the data. In the case where multiple criteria are used in combination to establish the priority, multiple methods of sorting, filtering, and grouping may be used. In these cases, after an initial sort, the data may be additionally sorted and ordered to comply with the prioritization criteria.

Figure 6:
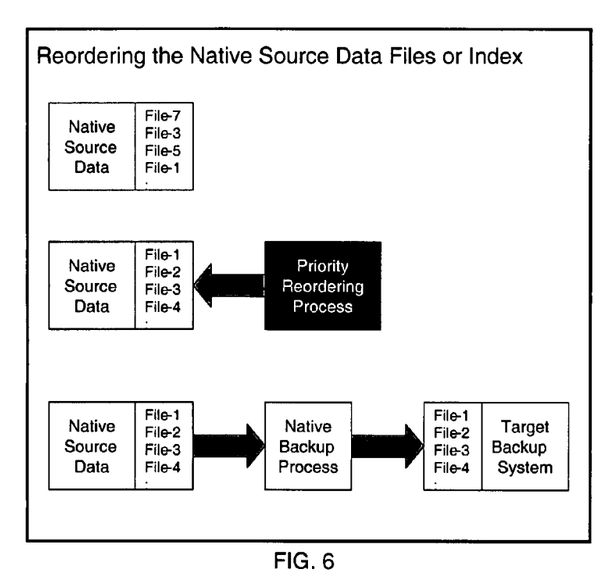
FIG. 6 is a flowchart illustrating a process for executing a prioritized backup through reordering in some embodiments of the invention.

In one embodiment, it may be desirable to have all files within a specified time period to be retrieved in order of timestamp attribute. It may also be preferred to have Microsoft Excel user files prioritized higher than any other file types. In this case, the backup priority would be ordered such that the most recently used Excel files come before any of the other files. Stable or unstable sorting algorithms may be used depending on the sort criteria and the desired outcome. For example, if simple temporal ordering is required, the files may be sorted by either a stable or unstable sort algorithm because the only criterion is timestamp. In the case of a stable sort algorithm (such as bubble sort), the original order of records with equal values will be kept even though the order of dissimilar records will change. Conversely, unstable sort algorithms (such as quick sort) may introduce sort orders that differ from the original order for records of equal value. If timestamp alone were the only sort criteria then an unstable sort algorithm would be acceptable. However, in the case where multiple sort elements are considered the use of stable sort algorithms may be beneficial. The data structure may be reordered at the time the backup operation is initiated, at the time of backup, or prior to the initiation of the backup operation. FIG. 6 illustrates this process.

Figure 7:
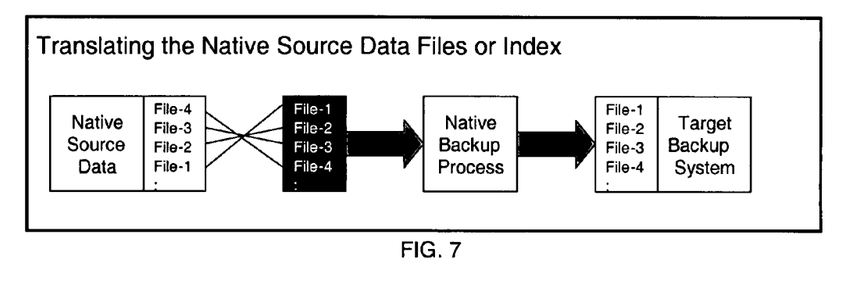
FIG. 7 is a flowchart illustrating a process for executing a prioritized backup through translation in some embodiments of the invention.

Some systems back up data that resides within a filesystem structure. In order to prioritize this backup sequence, the filesystem may be reordered to match the desired priority order. In an embodiment, a pseudo-filesystem structure may be created that is in priority order. The backup application may mount this pseudo-filesystem structure as it would normally mount the source data filesystem structure. In this case, the pseudo-filesystem is ordered according to the priority sequence and the source data remains in its original, native order, thus effectively providing a translation. The pseudo-filesystem may contain stubs that are associated to the underlying files/data. The backup system may thus restore the files in priority sequence. FIG. 7 illustrates this approach.

In some embodiments, it may be desirable to have the backup occur to a different location than the usual backup target. This may be done in order to shorten the backup time by using higher bandwidth connections, and/or in order to expedite a post-failure recovery operation. For example, a remote office may be connected to a headquarters location via a T1 data connection. This is a relatively low-bandwidth connection providing a maximum of 1.5 mbps. Backups take place either regularly or continuously from the server to the headquarters backup target over the WAN through the T1 connection. A mobile device, such as a laptop, may normally be configured to use the headquarters backup target. When the mobile device is at the remote office, it may be desired to have the backup take place over a LAN connection or other higher speed connection to a backup target at the remote office in order to optimize the backup speed. Mobile devices may not be connected for a long period of time and a faster connection will result in more data being backed up. Data backed up to the backup target at the remote office may be replicated or transmitted over the WAN to the headquarters backup target, and combined with data backed up to that destination. The data may be consolidated at the headquarters backup target or elsewhere. By selecting a backup target with a higher bandwidth connection, the recovery process may also be expedited. If more than one path is available, a path may be selected based on path performance or some combination of paths in order to obtain optimized throughput.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for backing up objects from a first location to a second location, comprising:
   determining objects to be backed up and a prioritization of the objects according to a first criterion, the first criterion comprising a predicted usage interval derived from an object periodicity, the predicted usage interval comprising a next predicted time of usage for each of the objects;
   adjusting the prioritization of the objects based on each object's next predicted time of usage, wherein the objects with an earlier predicted time of usage are prioritized before objects with a later predicted time of usage;
   transmitting the objects from the first location to the second location substantially in accordance with the prioritization;
   suspending the transmission of objects from the first location to the second location, based on a non-persistent network connectivity;
   continuing transmitting the objects; and
   determining objects to be backed up and recalculating prioritization dynamically according to the first criterion, wherein relevant changes in the objects are reflected.

2. The method as recited in claim 1, wherein suspending the transmission of the objects is associated with a loss of network connectivity, a user action, or throttling to reduce processor or network load.

3. The method as recited in claim 1, wherein continuing transmitting the objects is performed in accordance with the reprioritization of the objects.

4. The method as recited in claim 1, wherein the first criterion further comprises at least one selected from the group comprising: timestamp, object type, identity of object owner, and content.

5. The method as recited in claim 1, further comprising subsorting the prioritization of objects according to a second criterion.

6. The method as recited in claim 5, further comprising continuing transmitting the objects.

7. The method as recited in claim 6, further comprising determining objects to be backed up and reprioritization of the objects according to the second criterion.

8. The method as recited in claim 7, wherein continuing transmitting the objects is performed in accordance with the reprioritization of the objects.

9. A method for backing up objects from a source at a first location, comprising:
   determining objects to be backed up and a prioritization of the objects according to a first criterion, the first criterion comprising a predicted usage interval derived from an object periodicity, the predicted usage interval comprising a next predicted time of usage for each of the objects;
   adjusting the prioritization of the objects based on each object's next predicted time of usage, wherein the objects with an earlier predicted time of usage are prioritized before objects with a later predicted time of usage;
   transmitting the objects from the first location to the second location substantially in accordance with the prioritization;
   suspending the transmission of objects from the first location to the second location, based on a non-persistent network connectivity;
   continuing transmitting the objects; and
   determining objects to be backed up and recalculating prioritization dynamically according to the first criterion, wherein relevant changes in the objects are reflected.

10. The method as recited in claim 9, further comprising detecting a change in the location, and determining, based on the first location, a second destination.

11. The method as recited in claim 10, further comprising transmitting the objects from the source at the changed location to the second destination.

12. The method as recited in claim 9, further comprising combining the objects from the second destination with the objects from the first backup target to define a backup for the objects at the source.

13. The method as recited in claim 9, wherein the determination of the first backup target comprises choosing the destination from a plurality of available destinations based on bandwidth to the available destinations.

14. The method as recited in claim 9, wherein the first criterion further comprises one selected from the group comprising: timestamp, object type-identity of object owner, and content.

15. The method as recited in claim 9, further comprising subsorting the prioritization of objects according to a second criterion.

16. A computer program product for backing up objects from a first location to a second location, comprising a computer readable storage medium having machine readable code embodied therein for:
   determining objects to be backed up and a prioritization of the objects according to a first criterion, the first criterion comprising a predicted usage interval derived from an object periodicity, the predicted usage interval comprising a next predicted time of usage for each of the objects;
   adjusting the prioritization of the objects based on each object's next predicted time of usage, wherein the objects with an earlier predicted time of usage are prioritized before objects with a later predicted time of usage;
   transmitting the objects from the first location to the second location substantially in accordance with the prioritization;
   suspending the transmission of objects from the first location to the second location, based on a non-persistent network connectivity;
   continuing transmitting the objects; and
   determining objects to be backed up and recalculating prioritization dynamically according to the first criterion, wherein relevant changes in the objects are reflected.

* * * * *